| United States Patent [19] | [11] 4,023,873 |
|---|---|
| Barker | [45] May 17, 1977 |

[54] COMBINATION ARM REST

[76] Inventor: Aldro J. Barker, 2282 Fruitland Drive, North Ogden, Utah 84404

[22] Filed: Oct. 30, 1975

[21] Appl. No.: 627,056

[52] U.S. Cl. .............................. 312/235 A; 312/211; 232/43.1; 224/29 R

[51] Int. Cl.² .................... B60R 7/00; A47B 81/00

[58] Field of Search ............ 312/235 A, 211, 245; 297/411, 412, 450; 232/43.1, 43.2; 224/29 R, 29 A

[56] References Cited

UNITED STATES PATENTS

| 696,832 | 4/1902 | Maschke | 232/43.2 |
|---|---|---|---|
| 883,990 | 4/1908 | Warren | 312/211 |
| 1,121,089 | 12/1914 | Grenfell | 232/43.2 |
| 1,268,120 | 6/1918 | Howard | 312/245 |
| 1,647,275 | 11/1927 | Cursons | 232/43.1 |
| 1,790,977 | 2/1931 | Boer | 312/245 |
| 1,879,858 | 9/1932 | Schroedter | 232/43.1 |
| 2,319,725 | 5/1943 | Drinkwater | 232/43.1 |
| 2,726,035 | 12/1955 | Meissner | 232/43.1 |
| 3,620,566 | 11/1971 | Leconte | 297/412 |
| 3,918,121 | 11/1975 | Williams | 16/128 R |

Primary Examiner—P. R. Gilliam
Assistant Examiner—Victor N. Sakran
Attorney, Agent, or Firm—Lawrence J. Winter

[57] ABSTRACT

A combination armrest, trash receptacle, ashtray and cash container comprising an elongated substantially rectangular member having a substantially horizontal top forming an arm rest and with substantially vertical side wall co-extensive with said horizontal member with the front portion of the member being provided with a dish shaped container forming a cash tray with an elongated middle section forming a trash receptacle and a rearward section forming an ashtray with the horizontal section being provided with a hinge rod and the horizontal member having three separate doors hinged to the rod so that the three compartments therein can be separately opened. The trash receptacle in the middle of the horizontal portion is further provided with a cutout or opening to grasp for closing the vehicle and with the member further having a hinged bottom portion adjacent the middle and rear trash and ash sections for emptying the debris therefrom.

1 Claim, 4 Drawing Figures

COMBINATION ARM REST

The present invention relates to a new and useful improvement in an article holding and occupant serving tray which is functionally designed to be enclosed within an armrest so as to not only form the function of being an armrest but in addition thereto to provide the other additional functions of a cash receptacle or the like, a trash receptacle and an ashtray.

It is an object of the present invention to provide an armrest for a conventional vehicle which not only serves as an armrest but in addition thereto has hinged lids separating the armrest into different sections to provide adequate space for trash and debris and the usual coins for parking meters or fees or tolls and the like and an ashtray for the use of an occupant or occupants of the vehicle.

It is yet another object of the present invention to provide a combination armrest for a vehicle and convenient receptacles for other functions.

It is yet another object of the present invention to provide a combination armrest apparatus having different compartments therein with means for grasping the vehicle door so as to close it, which can be readily secured or installed in any vehicle presently on the road.

Various other objects and advantages of the present invention will be readily apparent from the following detailed description when considered in connection with the accompanying drawings forming a part thereof an in which.

Figure 1:
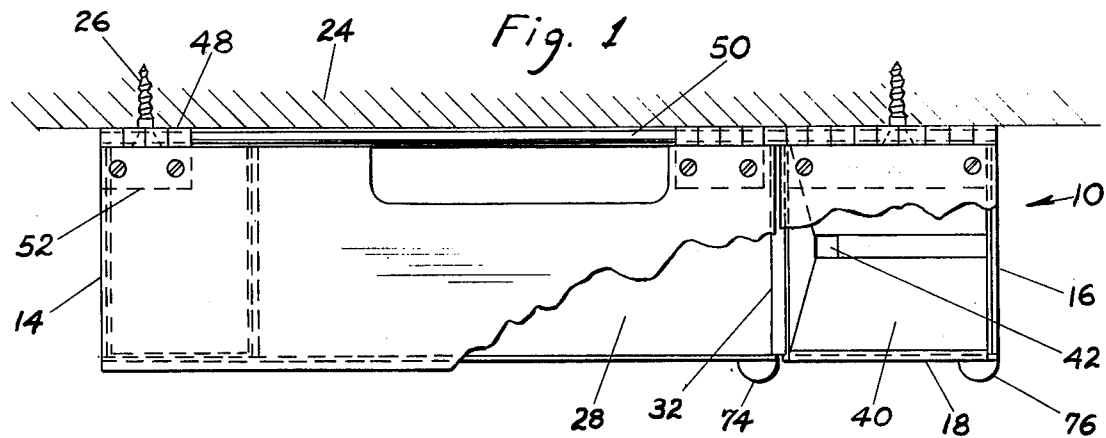
FIG. 1 is a top plan view illustrating the embodiment of the present invention.
Figure 2:
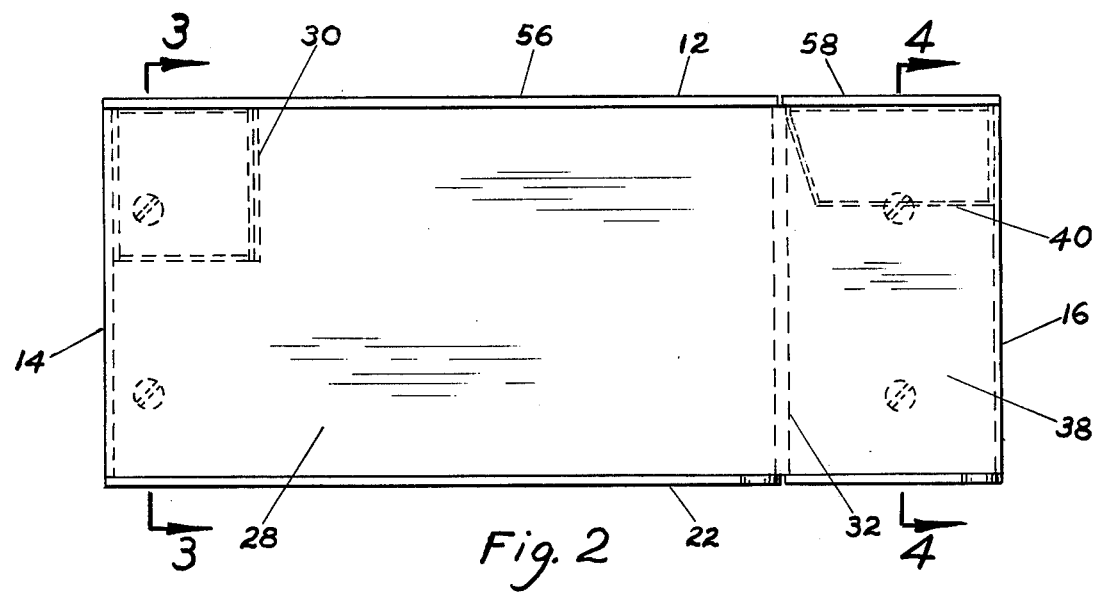
FIG. 2 is a side elevational view of the combination armrest embodied in the present invention.

Referring to the drawings, the reference numeral 10 generally designates the combination armrest apparatus embodied in the present invention having a substantially horizontal top 12. The opposite ends of the apparatus have substantially front and rear end walls 14 and 16 respectively with a substantially vertically extending inner side wall 18 and an outer side wall 20 and a bottom 22.

The armrest apparatus is preferably secured to the door panel 24 by screw members 26 although other means of securing the apparatus to the door may be utilized.

The trash compartment or receptacle 28 is substantially L shaped in configuration and is provided with a front and rear wall 30 and 32 respectively.

Figures 3, 4:
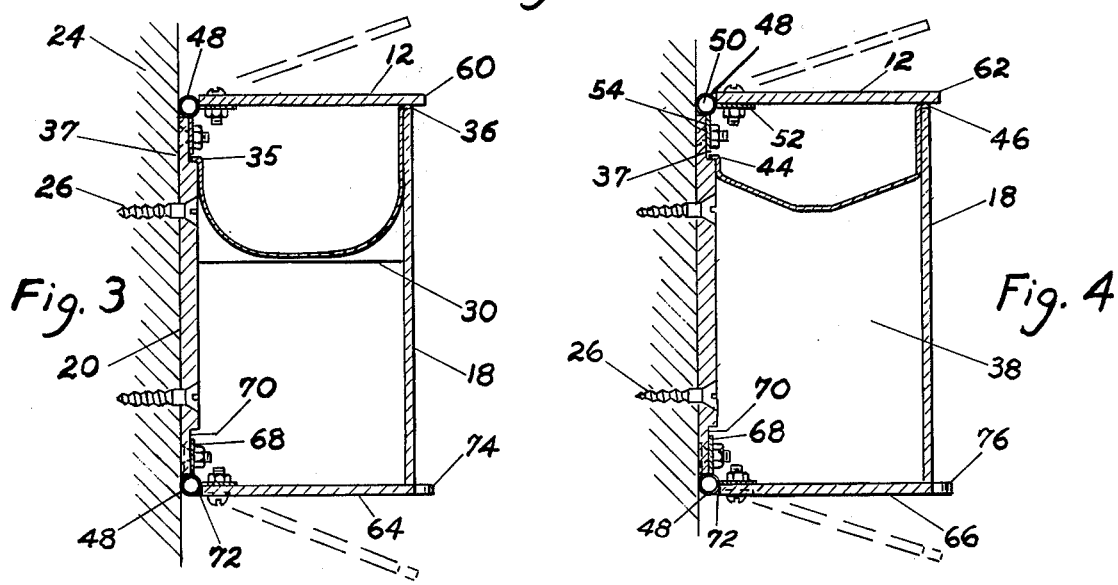
FIG. 3 is a section taken along the lines 3—3 of FIG. 2.
FIG. 4 is a view taken along the lines 4—4 of FIG. 2.

The cash tray or forward compartment is formed by the front wall 14 and wall 30 as well as by the side walls, and is preferably provided with a dish shaped inset 34, as best seen in FIG. 3, which has lips 35 and 36 bent outwardly and resting on a cut-out portion 37 in wall 20 and with the lip 36 resting on top of the wall 18.

The rear or ash container or receptacle 38 is defined by the top and bottom and side walls and the walls 32 and 16. As is best seen in FIG. 4, the ash container is also provided with an insert 40 having an opening 42 therein for dispensing cigarette butts therethrough. This insert 40 is also provided with lips 44 and 46 which rest respectfully on the cut-out 37 and wall 18 respectively.

The top 12 of the apparatus is secured to the wall 20 by a hinge member 48 comprising a hinge rod 50 with the hinges 52 and 54 secured to the top 12 and the cut-out 37 of the wall 20. The cash compartment 34 and the trash receptacle 28 are provided with a single hinge door 56, although of course they could be made of separate doors if desired.

The cigarette ashtray container is provided with a separate hinged lid 58 identical to that already described in connection with the hinged lid or door 56. As can be best seen in FIGS. 3 and 4, over extending edges 60 and 62 are provided for lifting the lids.

The bottom of the trash compartment 28 and the ash compartment 38 are provided with hinged bottom closures or hinged bottoms 64 and 66 respectively which are both hingedly connected to hinges 48, identical to the hinges 48 described in connection with the top hinged lids. The portion of the hinge 68 secured to the wall 20 are disposed in lower cut-out members 70 identical to the cut-outs 37 in the top of the wall 20. The hinged bottoms 64 and 66 are maintained in closed position by a coiled wire or spring member 72 attached to the hinged rod of the hinge member 48 and normally urging the closure members in a closed position.

As seen in FIGS. 1, 3 and 4 tabs or ears 74 and 76 are provided on bottoms 64 and 66 respectively for opening and emptying the compartments by pressing down on the tabs.

Thus from the foregoing description, it is apparent that the present invention provides a novel and compact combination armrest and cash receptacle and trash and ash receptacle that can be readily and economically installed on any vehicle.

It is not meant to limit the invention of the present invention inasmuch as various changes may be made in the location and arrangements of the parts, except by the appended claims.

What is claimed is:

1. In combination an arm rest attached to a vehicle door comprising a horizontally extending member with a top, a bottom, opposite vertical end walls and opposite vertical side walls forming a substantially rectangular compartment, a vertical partition adjacent one end of the compartment extending from said top to bottom, one of said vertical walls having cut-outs, a removal ash tray in said compartment between said vertical partition and adjacent end wall, said ash tray having horizontal lips disposed on said cut-out and extending over said side wall opposite it with a hole in the bottom to drop cigarettes therethrough, a removable cup-shaped member with horizontal lips extending over another cut-out and over said side wall opposite it, providing a cash compartment, the space between said cup shaped member and said ash tray forming a trash compartment, coiled spring means disposed in said bottom biasing it in a closed position, said top comprising separate hinged members for access to said individual compartments.

* * * * *